Patented Mar. 25, 1947

2,417,837

UNITED STATES PATENT OFFICE 2,417,837

LAMINATING PLASTIC SHEETS

Louis Paggi, Bellesville, N. J., assignor to E. I. du Pont de Nemours & Company, Wilmington, Del., a corporation of Delaware No Drawing. Application April 22, 1943, Serial No. 484,127

9 Claims. (Cl. 154—139)

This invention relates to laminating plastic sheets and to the resulting laminated article and, more particularly, to laminating sheets which do not readily adhere to each other but one of which will readily adhere to glass.

It is desirable for certain purposes to produce a laminated sheet in which at least two adjacent laminae are plastic sheets. Many plastic sheets do not readily adhere to each other, however. For example, polymerized methyl methacrylate sheets do not readily adhere to polyvinyl acetal resin sheets although, as disclosed in U. S. Patent 2,120,628 granted to E. W. Reid, plasticized polyvinyl acetal sheets may be used as interlayers in the production of laminated glass and they adhere readily to the glass.

Transparent materials are desirable for the construction of pressure cabins and turrets for airplanes used in stratosphere flying. For this purpose, plastics have advantages over glass in respect to weight, ease of forming relatively large pieces according to the contours desired by the airplane designers, and superior visibility after being struck by bullets. Because of these advantages transparent plastics, particularly those having an acrylic resin base, have been widely used in both military and commercial aircraft. Recently, however, there has been a growing demand for military aircraft capable of operating at altitudes of 35,000 feet and more, and this has led to the adoption of a positive pressure inside the cabin. Experience has shown, however, that when the present unlaminated plastic is used for such enclosures, they tend to shatter when struck by 0.50 caliber bullets when exposed to a pressure differential of 4 to 8 pounds per square inch and temperatures of —40° F. to —70° F., which are encountered at the altitude in question.

An object of the present invention is to provide a laminated sheet in which a sheet of plastic of the type which will readily adhere to glass, is joined with strong adhesion to a sheet of plastic to which it would not normally readily adhere. A more particular object is to provide such a laminated sheet which is transparent and adapted for use in the construction of pressure cabins and turrets for airplanes. A further object is to provide a laminated sheet in which a sheet of plastic comprising a polyvinyl acetal resin adheres to a sheet of plastic comprising polymerized methyl methacrylate. Other objects will be apparent from the description of the invention given hereinafter.

The above objects are accomplished according to the present invention by applying to one side of a plastic a substantially water-insoluble plasticizer therefor and a liquid polysilicic acid sol in an organic solvent, drying the coating thus formed to remove the organic solvent and obtain a dry, hard surface on the sheet, placing a second sheet not normally readily adherent to the first sheet but of the type characterized by being readily adherent to glass, in contact with the coated side of the first sheet, and then submitting the assembly to heat and pressure.

More specifically, the above objects are accomplished by providing as a coating for a sheet of polymerized methyl methacrylate, a liquid polysilicic acid sol in a volatile organic solvent, and a substantially water-insoluble solvent plasticizer for polymerized methyl methacrylate, drying the coated sheet to remove substantially all volatile components of the coating composition and to obtain a dry, hard surface on the sheet, placing a sheet of a plasticized polyvinyl acetal resin in contact with the coated surface of the first sheet, and submitting the assembly to heat and pressure.

It has been found that by following the proceduce of the present invention a sheet of polymerized methyl methacrylate and a sheet of a plasticized polyvinyl acetal resin may be adhered to each other with an adhesion far greater than that heretofore obtainable. In fact, the adhesion is so great when the present invention is properly carried out that there will be substantially no separation of the layers when a laminated sample is struck repeatedly with a hammer at temperatures —40° F., +20° F. and +120° F.; this test may be used to establish a satisfactory lamination according to the present invention but it is a test which is far more severe than the usual tests applied to laminations comprising a rigid sheet.

When the laminated sheets are to be formed with curved surfaces after lamination, it is necessary to remove air and vapors from between the laminae before completing the lamination. Otherwise on forming, these gases or vapors appear as bubbles. This removal can be accomplished by subjecting the assembly to a vacuum of about 25 inches or more before applying heat and pressure, preferably under such conditions that pressure is applied to the center of the assembly before the edges.

To provide for the easy removal of air from between the sheets, it is preferable that the surfaces of the center sheet be smooth but not tacky. Such a surface can be obtained on a sheet of polyvinyl butyral resin by an acid treatment as described in applicant's copending application Serial No. 344,705. By the use of sheeting so treated, the pre-pressing operation can be effected continuously by passing the assembly through heated rolls.

The plasticizer may be introduced in the silicic acid coating composition before it is sprayed on the sheet to be coated or the plasticizer may be sprayed on the sheet before the silicic acid composition is sprayed thereon or a solution of highly plasticized methyl methacrylate may be used in place of a plasticizer by itself in such a procedure.

The following examples wherein parts are given by weight unless otherwise specified, illustrate specific embodiments of the invention:

Example 1

A silicic acid sol in which the polysilicic acid was partially esterified was prepared as follows:

A solution of sodium silicate was made by diluting 100.8 parts of a sodium silicate solution having a 1:9 weight ratio of $SiO_2$ to $Na_2O$, to 400 parts with water. Dilute hydrochloric acid solution was made by diluting 201.6 parts of a commercial 22° Bé. solution to 400 parts. A silicic acid solution was made by adding one part of the acid solution to 3.15 parts by weight of the silicate solution with effective agitation at the point of contact of the solutions and throughout the batch. The polysilicic acid solution thus obtained had a pH of 1.7, contained silicic acid equivalent to 6% $SiO_2$ and sodium chloride equivalent to 7.2%. The solution was essentially water-thin and showed no evidence of gelling. The fluorine content was less than 20 P. P. M.

To the 4.15 parts of polysilicic acid solution thus obtained there was immediately added 1.04 parts of tertiary butyl alcohol with efficient mixing. There was then added 1.3 parts of sodium chloride which was approximately the amount required to saturate the water present with salt. After thorough mixing the solution was allowed to stand and there separated out as an upper layer a liquid constituting about 0.7 part or 11% of the total. This layer was decanted off and found to contain about 4% of silicon expressed as $SiO_2$, 12% of water, and 84% of tertiary butyl alcohol.

There was added to the 0.7 part of the tertiary butyl alcohol solution 0.7 part of n-butanol. The solution thus obtained was placed in a vacuum still and distilled under 40 mm. pressure absolute at 30° C. to 50° C. At 30° C. a water-tertiary butyl alcohol azeotrope was distilled over, at a slightly higher temperature tertiary butyl alcohol was distilled off, and at 50° C. n-butanol started to distill off. Ten per cent or 0.14 part of the original charge remained as a residue in the still. This residue was a partially esterified polysilicic acid product dissolved in n-butanol. Silicon was present equivalent to 20% expressed as $SiO_2$, the balance being substantially n-butanol with a trace of salt present.

On to one side of each of two sheets of ⅛ inch thick methyl methacrylate polymer was sprayed a thin uniform coating of the following composition:

| | Cubic centimeters |
|---|---|
| 20% silicic acid, partially esterified, in n-butanol prepared as above | 100 |
| Dimethyl phthalate (plasticizer) | 50 |
| Acetone (volatile solvent) | 150 |

The coated sheets were placed in an oven and dried at 140° C. for five minutes to obtain a dry, hard surface. A sheet of polyvinyl butyral resin containing 30% dibutyl sebacate as plasticizer, such sheet possessing the property of adhering readily to glass, was placed between the coated surfaces of the two methyl methacrylate polymer sheets and the assembly was placed for three minutes under 50 pounds per square inch pressure at 140° C. The composite sheet exhibited remarkable adhesion between the layers, there being substantially no separation of the layers when the composite sheet was struck repeatedly with a hammer at a temperature of —40° F.

Example 2

The procedure given in Example 1 was repeated using the following composition:

| | Cubic centimeters |
|---|---|
| Tetraethyl silicate | 15 |
| Ethyl alcohol (95%) | 35 |
| Conc. hydrochloric acid | 10 |
| Dimethyl phthalate | 40 |

Equally good results were obtained with this composition.

Example 3

Using the following composition, the procedure given in Example 1 was repeated except that the sheets were assembled without thoroughly drying the coated sheets:

| | Cubic centimeters |
|---|---|
| Tetraethyl silicate | 5 |
| Ethyl alcohol (95%) | 25 |
| Conc. hydrochloric acid | 2 |
| Dimethyl phthalate | 10 |

Equally good results were obtained with this composition.

It should be noted that in this example complete drying of the coating applied to the polymerized methyl methacrylate sheet was not carried out. It has been found that it is only permissible, if a lamination capable of passing the aforementioned test is to be formed, to incompletely dry the coating applied to the methyl methacrylate sheeting where the polysilicic acid sol in organic solvent is strongly acidic. If the composition has been acidified to an apparent pH of less than 1.5 as determined by the use of meta cresol blue as an indicator, then complete drying is not necessary. Since the apparent pH of the composition in this Example 3 was less than 1.5, it was possible to secure a satisfactory lamination without complete drying. This would also have been possible in Example 2 as the composition there has an apparent pH of less than 1.5 but, as illustrated in Example 2, equally satisfactory results may be obtained by drying the coating until the organic solvent is removed and a dry, hard surface is obtained.

Example 4

Using the following composition, the procedure given in Example 1 was repeated:

| | Cubic centimeters |
|---|---|
| 20% polysilicic acid (partially esterified) in normal butanol prepared as in Example 1 | 5 |
| Dimethyl phthalate | 5 |
| Ethyl alcohol (95%) | 25 |

The lamination obtained here was also capable of withstanding the aforementioned test.

Example 5

An aqueous solution of polysilicic acids is prepared by adding 900 parts of a 15.5% solution of sodium silicate ($SiO_2$; $Na_2O$=3.25:1) to 860 parts of a vigorously stirred solution of 7% aqueous sulfuric acid over a period of ten minutes. To the resulting solution 196 parts of tributyl phosphate and 460 parts of sodium chloride are added. Stirring is continued for one hour and then the mixture is allowed to stand for one hour. The upper, tributyl phosphate layer is separated, centrifuged, and dried over anhydrous sodium sulfate. The yield of clear, amber, tributyl phosphate solution of polysilicic acids is 125 parts. Its composition and properties are as follows:

| Per cent SiO$_2$ | Per cent C | Per cent H | Per cent P | Per cent Free Water |
|---|---|---|---|---|
| 16.5 | 43.86 | 9.02 | 8.91 | 3.4 |

Specific gravity, 25°/25° C. 1.0842. Refractive index at 25° C. 1.4269.

One side of each two sheets of methyl methacrylate polymer 1/8 inch thick were sprayed with a solution composed of:

|  | Parts |
|---|---|
| Methyl methacrylate polymer | 10 |
| Dimethyl phthalate | 20 |
| Acetone | 70 |

Following this coat, there is sprayed onto the surface of the sheet a composition of polysilicic acid-tributyl phosphate prepared as above described. The sprayed sheeting is then dried at about a temperature of 140° F. for twenty minutes. A sheet of plasticized polyvinyl butyral resin 0.160 inch thickness and possessing the property of adhering readily to glass is then placed between the coated surfaces of the two sheets and the assembly is pressed at a temperature of 220° F. and a pressure of 75 pounds per square inch for ten minutes. The assembly is then placed in an autoclave and subjected to a pressure of 200 pounds per square inch at a temperature of 245° F. for fifteen minutes.

The laminated sheets were tested by mounting in a frame so that the two sides of the sheets could be subjected to a pressure differential of 7.5 pounds per square inch. When struck by a 50 caliber bullet, while exposed to this pressure differential and to a temperature of —40° F., the sheets did not shatter and the layers did not separate.

*Example 6*

| Adhesive composition: | Parts |
|---|---|
| Dimethyl phthalate | 25 |
| Polysilicic acid sol (20% sol in butanol) | 25 |
| Ethyl alcohol (95%) | 49 |
| Conc. hydrochloric acid | 1 |

The adhesive was sprayed on methyl methacrylate polymer sheets approximately 1 cc. per square foot of sheeting. The sheets were then taken to a room maintained at approximately 60° F. and 20% relative humidity where the assembly was made. A polyvinyl butyral sheet containing 27% plasticizer, such sheet possessing the property of adhering readily to glass, was placed between the treated methyl methacrylate polymer sheets. The assembled lamination was then placed between clean plate glass. This entire assembly was then taped at the edges to prevent the interlayer from adhering to the rubber bag, during the autoclaving operation. The assembly was then placed in a rubber bag, sealed, and thoroughly evacuated. It was then placed in an oil autoclave and run at 245° C. and 200 pounds pressure per square inch for twenty minutes. The assembly was thereafter removed from the rubber bag and the plate glass sheets stripped from the assembly to leave the lamination of two methyl methacrylate polymer sheets with the polyvinyl butyral sheet interposed. There was no difficulty in separating the plate glass sheets from the assembly since these sheets were only in contact with the methyl methacrylate polymer sheets to which they do not adhere. The resulting lamination had good clarity and adhesion and was free from distortion. It was softened and then formed by heating it in an oven maintained at 275° F. for twelve minutes. The formed piece, which was semicylindrical in shape with a radius of 22 inches and a length of 17 inches, was then attached to a test frame, cooled to —40° F. by immersion in a mixture of alcohol and solid carbon dioxide, and the time of immersion was approximately fifteen minutes. After this the inner surface of the specimen was subjected to a pressure of 7.5 pounds per square inch exerted by a volume of approximately 14 cubic feet of compressed air. An armor piercing bullet from a 0.50 caliber machine gun was then fired through the test piece in such a way that it entered one side and emerged through the other. The entering hole was approximately 0.5 inch in diameter and was surrounded by a few short radial cracks. The exit hole was 0.75 inch in diameter and was also surrounded by a few short radial cracks. There was no separation whatever from the layers at the point of impact and no tendency at all towards shattering. The holes were then sealed, the piece was re-cooled and again subjected to pressure, and a second shot was fired without causing the piece to shatter.

It will be understood that the above examples are merely illustrative and that the invention broadly relates to laminating plastic sheets, particularly two sheets not normally readily adherent to each other but one of which is the type characterized by being readily adherent to glass. The polysilicic acid sol in organic solvent applied to one plastic sheet serves to provide a surface to which the plastic sheet characterized by being readily adherent to glass will firmly adhere.

The preparation of liquid polysilicic acid sols has been illustrated in the examples. Methods of preparing these compositions are more fully disclosed in U. S. patent applications Serial No. 396,564, filed June 4, 1941; Serial No. 439,547, filed April 18, 1942; Serial No. 439,549, filed April 18, 1942, all of which were filed in the name of Joseph S. Kirk; and Serial No. 439,548, filed April 18, 1942, in the names of Ralph K. Iler and Joseph S. Kirk. These applications are assigned to the assignee of the present application. As shown in Example 1 and disclosed in application Serial No. 439,549, the polysilicic acid may be partially esterified. The particular method of preparing the polysilicic acid sols forms no part of the present invention and they may be prepared in other ways than here disclosed.

An integral part of the present invention is the inclusion of a plasticizer for the plastic of which the sheet to be coated is comprised, in the coating for the sheet. This plasticizer may be applied to the sheet before the polysilicic acid sol is applied in which case it is usually dissolved in a volatile organic solvent with or without the addition of some of the plastic of which the sheet is made. It has been found that the inclusion of a minor proportion of polymerized methyl methacrylate serves to improve the adherence of plasticized polyvinyl acetal sheeting to polymerized methyl methacrylate sheeting when they are laminated according to the present invention. The organic solvent for the polysilicic acid sol must be, however, a solvent for the plasticizer. This is illustrated in Example 5.

The plasticizer may be included in the polysilicic acid sol composition. The proportion of plasticizer can be varied widely but it is preferably added in an amount between 10% and 60% by weight of the composition excluding volatile organic solvent. A proportion of about 30% plasticizer has been found usually most suitable. A plasticizer content below about 10% reduces the adhesion produced between the laminated sheets and below about 5% of plasticizer the adhesion is seriously weakened.

To facilitate spraying or coating in other manner the composition to obtain a uniform thin coat on the sheet being treated, a volatile organic solvent is preferably added to the composition in an amount about equal to the volume of the composition containing the plasticizer. The amount of volatile organic solvent added for this purpose may be varied widely as will be understood by those skilled in the art. The polysilicic acid sol may contain a considerable amount of solvent added during its preparation—in Example 5 it contains tributyl phosphate in sufficient proportion that the sol composition could be satisfactorily sprayed on the sheet without addition of further solvent although in this instance the plasticizer was applied to the sheet first. While tributyl phosphate is not highly volatile, it is sufficiently volatile for use in the present invention. The volatile solvent, or mixture of volatile solvents if a mixture is used, must necessarily be a solvent for the plasticizer.

The selection of the particular plasticizer to be used in this invention is dependent on the plastic of the sheet to be coated since it must be a plasticizer therefor. Plasticizers for various plastics are well known in the art; for a sheet of polymerized methyl methacrylate suitable plasticizers include dimethyl phthalate, diethyl phthalate, dimethyl azelate, di-methoxyethyl adipate, dimethoxyethyl phthalate, and dimethyl sebacate. The plasticizers should be substantially water-insoluble and should have solvent action on the plastic of the sheet being coated. The particular volatile solvent selected is governed by the plasticizer used as it must be a solvent therefor and, further, it must be a solvent for the polysilicic acid and, preferably although not necessarily, should have some solvent or softening action on the plastic of the sheet being coated. Alcohols, ketones, esters of organic or inorganic acids, ethers, amides, and organic acids are generally adapted for this purpose and the selection of one for a specific set of conditions will present no problem to those skilled in the art. Acetone or one of the lower aliphatic monohydric alcohols up to and including n-butanol will usually be selected.

Since the present invention affords a means of adhering with unusual strength any two sheets of plastic so long as one of the sheets is characterized by being readily adherent to glass, the broad application of the invention is quite apparent. Its greatest value lies, however, in adhering two sheets of plastic that normally are not adherent to each other or, at least, adhere to each other only rather weakly. As sheets of polymerized methyl methacrylate and sheets of plasticized polyvinyl acetal resin fall into this latter category and yet a lamination of the two is in demand, this invention is of prime importance with respect to laminating these two types of sheets. The sheets of polymerized methyl methacrylate may be composed of straight polymerized methyl methacrylate with or without plasticizers, modifying agents, and the like, or copolymers of methyl methacrylate with other polymerizable compounds and the term polymerized methyl methacrylate is used herein in that broader sense.

Sheets of polymerized methacrylic and acrylic acid compounds generally, including the methyl, ethyl, propyl and other esters, the anhydrides and the acids, are well adapted to be laminated according to the present invention but the invention is applicable to plastic compositions generally, providing one of the sheets is readily adherent to glass.

The polyvinyl acetal sheets characterized by being readily adherent to glass are well known in the art since such sheets are widely used in the manufacture of laminated glass. Plasticized polyvinyl butyral resins have been used for this purpose more than others but resins obtained by reacting a hydrolyzed polyvinyl ester with aliphatic aldehydes having from 2 to 6 carbon atoms, inclusive, may all be used. Reference is made to the aforementioned U. S. Patent 2,120,628 for disclosure of numerous plasticized polyvinyl acetal resins strongly adherent to glass although the present invention is by no means limited to these particular resins nor to sheets of any polyvinyl resin since it is adapted to laminate sheets of any plastic readily adherent to glass.

It is important in carrying out the present invention that the coated sheet be adequately dried before laminating it. The coating should be dried to provide a hard, dry surface if adhesion of the greatest strength is to be obtained. The only exception to this is in instances where the polysilicic acid sol composition is strongly acidic. It has been found that if the apparent pH of the composition, indicated by meta cresol blue, is less than 1.5, it is not necessary to dry the coating thoroughly. The particular temperature at which the coating should be dried is not critical and the temperatures given in the examples are merely illustrative. The extent of drying depends upon the volatility of the volatile components of the composition and, of course, drying at lower temperatures must be continued for a greater length of time than when higher temperatures are used. A drying at 45° C. for fifteen hours or 70° C. for two hours has usually been found adequate. The extent of drying required for any specific composition can be readily determined by noting when the coated surface becomes dry and relatively hard.

The invention has been described with respect to laminating sheets and its greatest use is believed to be for this purpose. The invention is nevertheless applicable to laminating or uniting other shapes. Further, the invention is applicable to laminating a plurality of sheets as well as just two sheets. A transparent lamination comprising two sheets of polymerized methyl methacrylate with a sheet of plasticized polyvinyl butyral resin interposed, made in accordance with this invention, is especially valuable for use in the construction of airplanes designed for flying at great altitudes. In making such a lamination one side of each sheet of polymerized methyl methacrylate is coated, dried, and the sheets then assembled with the coated side of each sheet adjacent the interposed polyvinyl butyral sheet, and united under heat and pressure.

Laminated sheeting produced in accordance with this invention is particularly adapted for use in constructing pressure cabins and turrets for airplanes used in stratosphere flying as the tendency toward shattering under these conditions is very much reduced and the protection to the pilot and crew is therefore increased very materially. A sheet, so produced from two sheets of polymerized methyl methacrylate and a sheet of polyvinyl butyral resin, can be readily formed into the desired shape and exhibits the other properties required for this use. The interlayer under certain conditions will self-seal or substantially self-seal a bullet hole, particularly when it is maintained at not too low a temperature, as may be the case when two sheets of the laminated material with an air space between are used so that the inner laminated sheet is insulated from the outside cold.

As many apparently widely different embodiments of this invention may be made without departing from the spirit and scope thereof, it is to be understood that the invention is not limited to the specific embodiments thereof except as defined in the appended claims.

I claim:

1. Process of laminating a sheet of plastic from the group consisting of polymers of acrylic and methacrylic acids, their esters, and anhydrides, and a second sheet comprising a plasticized polyvinyl acetal resin acetalized with an aliphatic aldehyde having from 2 to 6 carbon atoms, said two sheets not being normally readily adherent to each other, which process comprises coating one side of said first sheet of plastic with a water-insoluble plasticizer therefor and a polysilicic acid sol in an organic solvent for said plasticizer, drying the coating thus formed to remove the organic solvent and to obtain a dry, hard surface on said first sheet, placing said second sheet in contact with the coated side of said first sheet, and uniting the two under heat and pressure.

2. Process of laminating a sheet of plastic from the group consisting of polymers of acrylic and methacrylic acids, their esters, and anhydrides, and a second sheet comprising a plasticized polyvinyl acetal resin acetalized with an aliphatic aldehyde having from 2 to 6 carbon atoms, said two sheets not being normally readily adherent to each other, which process comprises coating one side of said first sheet of plastic with a water-insoluble plasticizer therefor and a polysilicic acid sol in a volatile monohydric aliphatic alcohol, drying the coating thus formed to remove the organic solvent and to obtain a dry, hard surface on said first sheet, placing said second sheet in contact with the coated side of said first sheet, and uniting the two under heat and pressure.

3. Process of laminating a sheet of plastic from the group consisting of polymers of acrylic and methacrylic acids, their esters, and anhydrides, and a second sheet comprising a plasticized polyvinyl acetal resin acetalized with an aliphatic aldehyde having from 2 to 6 carbon atoms, said two sheets not being normally readily adherent to each other, which process comprises coating one side of said first sheet of plastic with a water-insoluble plasticizer therefor and a polysilicic acid sol in a volatile monohydric aliphatic alcohol, the polysilicic acid being partially esterified with n-butanol, drying the coating thus formed to remove the organic solvent and to obtain a dry, hard surface on said first sheet, placing said second sheet in contact with the coated side of said first sheet, and uniting the two under heat and pressure.

4. Process of laminating a sheet of plastic from the group consisting of polymers of acrylic and methacrylic acids, their esters, and anhydrides, and a second sheet comprising a plasticized polyvinyl butyral resin, which process comprises coating one side of said first sheet with a water-insoluble plasticizer therefor and a polysilicic acid sol in an organic solvent for said plasticizer, drying the coating thus formed to remove the organic solvent and to obtain a dry, hard surface on said first sheet, placing said second sheet in contact with the coated side of said first sheet, and uniting the two under heat and pressure.

5. Process of laminating a sheet of plastic from the group consisting of polymers of acrylic and methacrylic acids, their esters, and anhydrides, and a second sheet comprising a plasticized polyvinyl butyral resin, which process comprises coating one side of said first sheet with a water-insoluble plasticizer therefor and a polysilicic acid sol in a volatile monohydric aliphatic alcohol, drying the coating thus formed to remove the organic solvent and to obtain a dry, hard surface on said first sheet, placing said second sheet in contact with the coated side of said first sheet, and uniting the two under heat and pressure.

6. Process of laminating a sheet of plastic from the group consisting of poylmers of acrylic and methacrylic acids, their esters, and anhydrides, and a second sheet comprising a plasticized polyvinyl butyral resin, which process comprises coating one side of said first sheet with a composition comprising dimethyl phthalate and a polysilicic acid sol in a volatile monohydric aliphatic alcohol, drying the coating thus formed to remove the organic solvent and to obtain a dry, hard surface on said first sheet, placing said second sheet in contact with the coated side of said first sheet, and uniting the two under heat and pressure.

7. Process of laminating a sheet comprising polymerized methyl methacrylate and a second sheet comprising a plasticized polyvinyl butyral resin, which process comprises coating one side of said first sheet with a water-insoluble plasticizer therefor and a polysilicic acid sol in a volatile monohydric aliphatic alcohol, drying the coating thus formed to remove the organic solvent and to obtain a dry, hard surface on said first sheet, placing said second sheet in contact with the coated side of said first sheet, and uniting the two under heat and pressure.

8. Process of laminating a sheet comprising polymerized methyl methacrylate and a second sheet comprising a plasticized polyvinyl butyral resin, which process comprises coating one side of said first sheet with a composition comprising a water-insoluble plasticizer therefor and a polysilicic acid sol in a volatile monohydric aliphatic alcohol, the polysilicic acid being partially esterified with n-butanol, drying the coating thus formed to remove the organic solvent and to obtain a dry, hard surface on said first sheet, placing said second sheet in contact with the coated side of said first sheet, and uniting the two under heat and pressure.

9. Process of laminating a sheet comprising polymerized methyl methacrylate and a second sheet comprising a plasticized polyvinyl butyral resin, which process comprises coating one side of said first sheet with a composition comprising dimethyl phthalate and a polysilicic acid sol in a volatile solvent from the group consisting of acetone and ethyl alcohol, the polysilicic acid being partially esterified with n-butanol, drying the coating thus formed to remove the organic solvent and to obtain a dry, hard surface on said first sheet, placing said second sheet in contact with the coated side of said first sheet, and uniting the two under heat and pressure.

LOUIS PAGGI.

REFERENCES CITED

The following references are of record in the file of this patent:

UNITED STATES PATENTS

| Number | Name | Date |
|---|---|---|
| 2,258,220 | Rochow | Oct. 7, 1941 |
| 2,299,552 | McGregor et al. | Oct. 20, 1942 |
| 2,317,891 | Pittsburgh Plate Glass Co. | Apr. 27, 1943 |